United States Patent
Gutzmer

(12) 
(10) Patent No.: US 6,563,866 B1
(45) Date of Patent: May 13, 2003

(54) BUS-POWERED MODEM INTERFACE DEVICE

(75) Inventor: Alan A. Gutzmer, Poway, CA (US)

(73) Assignee: Gutzmer Enterprises, San Diego, CA (US)

( * ) Notice: Subject to any disclaimer, the term of this patent is extended or adjusted under 35 U.S.C. 154(b) by 0 days.

(21) Appl. No.: 09/370,267

(22) Filed: Aug. 9, 1999

(51) Int. Cl.⁷ .............................. H04M 1/00; G06F 1/26
(52) U.S. Cl. ...................................... 375/222; 379/442
(58) Field of Search ................................. 370/294, 395; 375/222; 379/99, 393–444; 713/2–330; 710/100; 709/220

(56) References Cited

U.S. PATENT DOCUMENTS

| | | | | |
|---|---|---|---|---|
| 4,907,267 A | * | 3/1990 | Gutzmer | ..................... 379/442 |
| 5,912,964 A | * | 6/1999 | Stelman | ..................... 370/294 |
| 6,128,743 A | * | 10/2000 | Rothenbaum | ..................... 710/100 |
| 6,178,514 B1 | * | 1/2001 | Wood | ..................... 370/395.2 |
| 6,343,126 B1 | * | 1/2002 | Stelman | ..................... 377/47 |
| 6,408,351 B1 | * | 6/2002 | Hamdi et al. | ..................... 375/368 |

FOREIGN PATENT DOCUMENTS

JP 02001125689 A * 5/2001

* cited by examiner

*Primary Examiner*—Stephen Chin
*Assistant Examiner*—Lawrence Williams
(74) *Attorney, Agent, or Firm*—Brown, Martin, Haller & McClain LLP

(57) ABSTRACT

A modem interface device is coupled to a computer such that the device is powered via a power signal received from a bus port of the computer, such as a Universal Serial Bus (USB) port, a RS-232 port, or a PS-2 port. The modem interface device has a telephone base connector, a modem connector, a power connector, a two-to-four-wire converter circuit, and a power distribution circuit. The two-to-four-wire converter circuit bidirectionally couples signals between the telephone base connector and the modem connector. The power distribution circuit receives electrical power from the power connector and supplies power to the two-to-four-wire converter circuit.

11 Claims, 3 Drawing Sheets

BUS-POWERED MODEM INTERFACE DEVICE

BACKGROUND OF THE INVENTION

1. Field of the Invention

The present invention relates generally to interfaces or accessories for facilitating computer communications using a modem and, more specifically, to such a device that couples the modem to the telephone line via the handset jack of a telephone instrument and receives power from a bus connector on the computer.

2. Description of the Related Art

A computer modem cannot easily be connected to a digital or PBX-type telephone system. The problem is described in U.S. Pat. No. 4,907,267, issued to Gutzmer, entitled "MODEM INTERFACE DEVICE." In a PBX telephone system, multiple lines are serviced by a central controller. It is difficult to achieve dedicated line service for a modem because the telephone line to which a particular telephone instrument is connected carries digital line selection information and power in addition to the audio frequency communication signal of the handset. To solve this problem, the above-referenced U.S. patent describes a solution in which a modem is connected to the telephone system via the handset jack of the telephone instrument base unit. The patent describes an interface device that allows a user to switch between voice and data communication. To use the interface device, both the modem and the handset that was unplugged from the telephone instrument are plugged into the device. The device is then plugged into the handset jack of the telephone instrument base. The device has a switch that allows the user to selectively connect either the handset or the modem to the handset jack. The interface device converts the two-wire modem connection to the four-wire handset connection using a transformer. The transformer also provides impedance matching. Konexx of San Diego, Calif. produces a line of modem interface products based upon this concept.

The above-described modem interface devices are most commonly used with portable or notebook computers by travelers in hotel rooms and other locations having digital or PBX-type telephones. The traveler must carry the device along with his computer and other accessories. Accordingly, it would be desirable to minimize the size and weight of such a device. A battery or AC wall outlet adapter is typically included to power the internal circuitry of the device and to supply power to the modem. A modem normally uses loop current it receives from a telephone jack, but when the telephone jack is replaced with the interface device, a separate power source must be provided. An internal battery necessitates an enclosure large enough to contain it and adds weight to the device. An AC adapter is bulky and inconvenient for the traveler to store and carry along with the computer.

It would be desirable to miniaturize a modem interface device by minimizing the extent of its power supply. These problems and deficiencies are clearly felt in the art and are solved by the present invention in the manner described below.

SUMMARY OF THE INVENTION

The present invention relates to connecting a modem interface device to a computer such that the device is powered via a power signal received from a bus port of the computer. The computer is preferably a portable computer. The bus port can be, for example, a universal serial bus (USB) port, a RS-232 port, or a PS-2 port. The modem interface device has a telephone base connector, a modem connector, a power connector, a two-to-four-wire converter circuit, and a power distribution circuit. The two-to-four-wire converter circuit bidirectionally couples signals between the telephone base connector and the modem connector. The power distribution circuit receives electrical power from the power connector and supplies power to the two-to-four-wire converter circuit and the modem.

In accordance with the method of the present invention, a user connects the modem connector to a modem communication port of the computer. The user also connects the telephone base connector to the handset jack of the telephone instrument base. Importantly, the user further connects the power connector to the bus port of the computer. The bus port has power and data signals, but only the power signals and not the data signals are coupled into the power connector of the device. In other words, the device uses the bus port not for its normal purpose of data communication with the computer but rather only for the purpose of tapping into its power signals. Because the device uses the power signals provided by the bus port, it does not need a battery or AC adapter to supply power. The device can therefore be made smaller in size and lighter in weight than prior modem interface devices.

The foregoing, together with other features and advantages of the present invention, will become more apparent when referring to the following specification, claims, and accompanying drawings.

BRIEF DESCRIPTION OF THE DRAWINGS

For a more complete understanding of the present invention, reference is now made to the following detailed description of the embodiments illustrated in the accompanying drawings, wherein.

DESCRIPTION OF A PREFERRED EMBODIMENT

Figure 1:
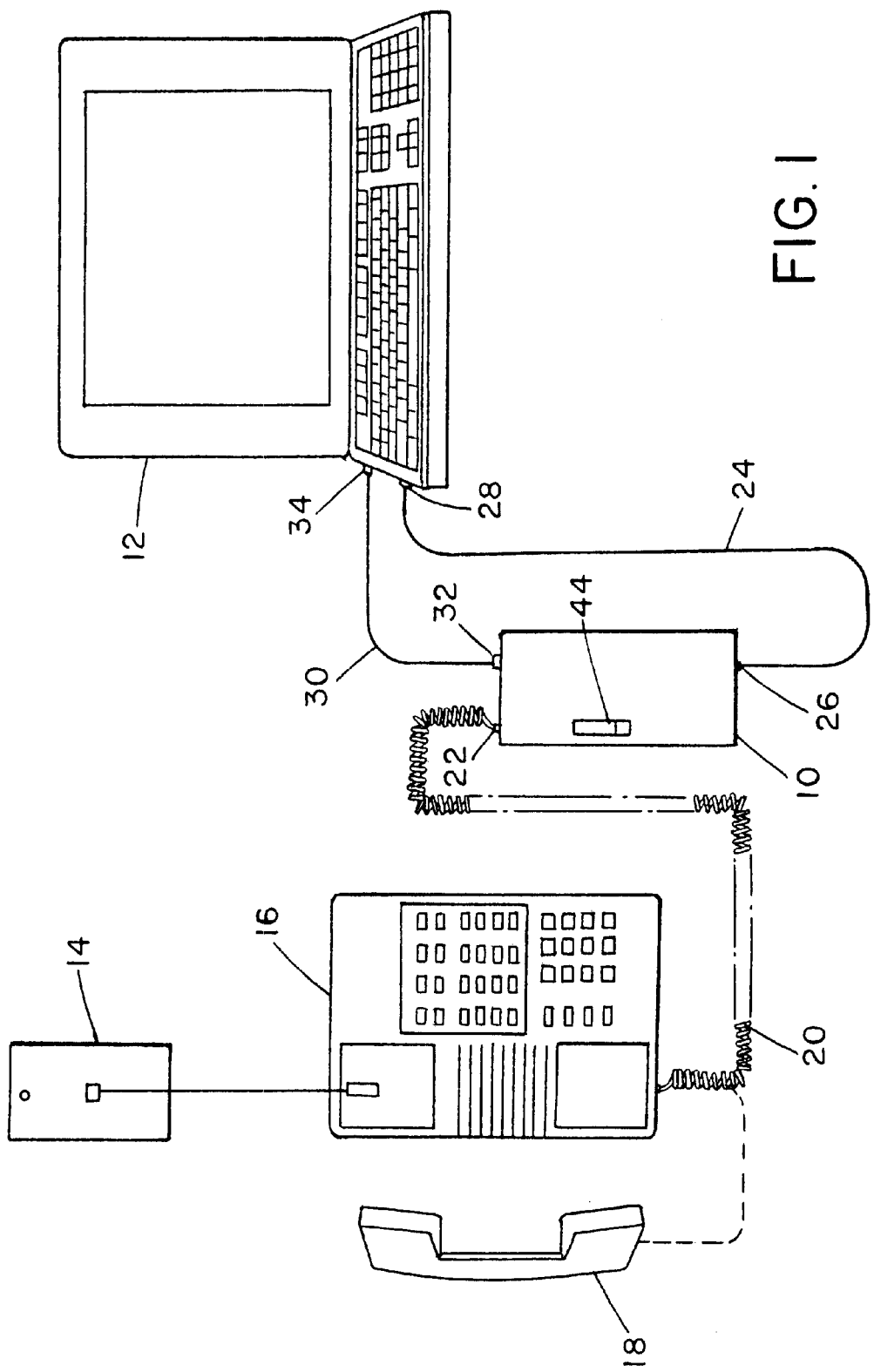
FIG. 1 illustrates a modem interface device of the present invention connected between a telephone instrument and a modem of a portable computer.

As illustrated in FIG. 1, a modem interface device 10 of the present invention couples a laptop or other portable computer 12 to the telephone line at the wall jack 14 via a telephone instrument base 16. To achieve this configuration, a user first removes or unplugs the handset 18 from the handset cord 20 that connects it to telephone instrument base 16. The user then plugs handset cord 20 into a telephone base connector 22 of device 10. The user also plugs one end of a modem cable 24 into a modem connector 26 of device 10, and the other end into the modem port jack 28 of computer 12. The user further plugs one end of a power cable 30 into a power connector 32 of device 10, and the other end into the universal serial bus (USB) port jack 34 of computer 12.

As described in further detail below, device 10 allows computer 12 to communicate via its internal modem with a remote computer or terminal (not shown). Because the telephone line at wall jack 14 is of the digital or PBX-type commonly used in commercial buildings, a modem cannot be connected directly to it as it could if the telephone line were of the more common analog type commonly used in residential buildings.

Device 10 receives the power for its active electronic components (described below) and for the modem loop current from the USB. In accordance with the well-known USB standard, the USB carries four signals, one of which is power (+5 VDC), another of which is ground, and the other two of which are serial data stream signals. Computer peripherals that communicate with a computer via its USB port commonly receive both the serial data stream signal and the power and ground signals. Device 10 receives or taps into the power and ground signals only, and does not tap into or otherwise interfere with the serial data stream signals. Although in the illustrated embodiment device 10 is connected to USB port jack 34, in an alternative embodiment it can be connected via a suitably configured connector to a RS-232 port jack of device 12, a PS2 port jack of device 12, or the port jack of any other suitable bus that provides a power signal. Portable computers may include jacks or other connectors that provide access to any of a number of well-known data communication busses, some of which provide a power signal. (Note that the term "jack" is used herein only for convenience, as the actual connector may be a jack, plug or other type of connector.) Because device 10 draws its power from the USB of computer 12, it need not include any type of battery, AC line adapter, or other power supply. It can therefore be smaller in size and lighter in weight than prior modem interface devices that included an internal battery or accompanying AC line adapter. Its compact size and light weight make it ideal for travelers who use their portable computers in hotel rooms and other places in which no analog telephone line service is available.

Figure 2:
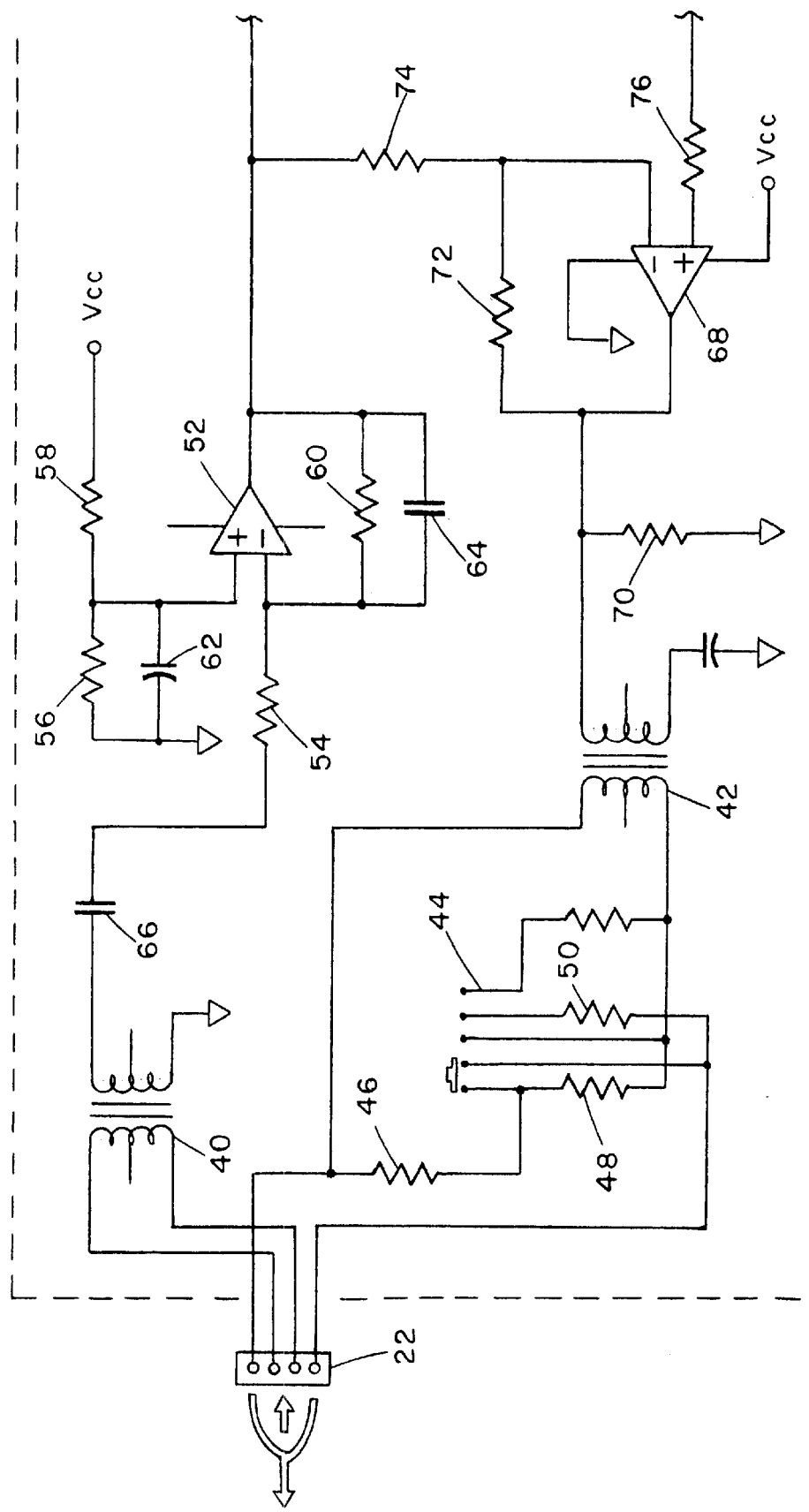
FIG. 2 is a schematic diagram showing the circuitry of the modem interface device.
Figure 3:
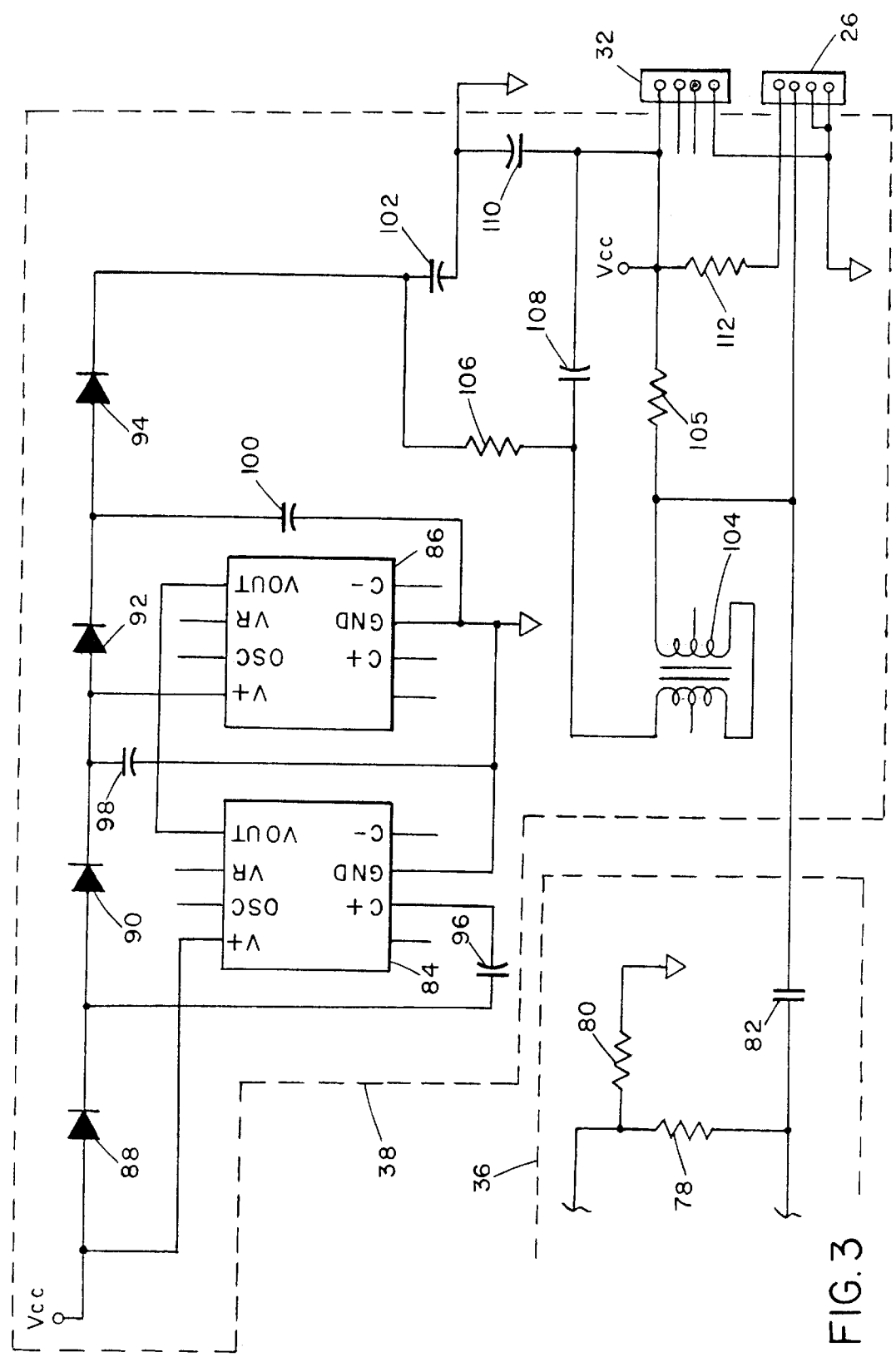
FIG. 3 is a continuation of the schematic diagram of FIG. 2.

As illustrated in FIGS. 2 and 3, device 10 includes, in addition to telephone base connector 22, modem connector 26 and power connector 32, a two-to-four-wire converter 36 and a power distribution circuit 38. Telephone base connector 22 is of the RJ22 modular type commonly included in telephone instruments. Two-to-four-wire converters, also known as hybrid circuits, are well-known in the art. (See, e.g., U.S. Pat. Nos. 4,907,267 and 5,625,679, issued to Gutzmer.) Briefly, however, two-to-four-wire converter 36 includes two transformers 40 and 42 that provide transformer-coupled isolation between the modem and telephone instrument base 16. It further includes a four-position switch 44 that allows a user to select an optimal signal level for the attenuation characteristics of telephone instrument base 16. The signal level selection circuit also includes resistors 46, 48 and 50. Two-to-four-wire converter 36 includes two amplifier circuits for bidirectional communication. One amplifier circuit receives signals from the "microphone" terminals of telephone base connector 22 and couples them via transformer 40 to modem connector 26.

Modem connector 26 is of the RJ11 modular type. A capacitor 43 couples one terminal of transformer 42 to ground. This circuit includes an op-amp 52, resistors 54, 56, 58 and 60, and capacitors 62, 64 and 66. Resistor 56 and capacitor 62 are in parallel and connected between the non-inverting input of op-amp 52 and ground. Resistor 60 and capacitor 64 are in parallel and are connected between the inverting input of op-amp 52 and the input of the other amplifier circuit. The non-inverting input of op-amp 52 is also coupled to the supply voltage (VCC) via resistor 58. The other amplifier circuit receives signals from modem connector 26 and couples them via transformer 42 to the "speaker" terminals of telephone base connector 22. The circuit includes an op-amp 68, a resistor 70 connected between the output of op-amp 52 and ground, and a resistor 72 connected between the inverting input of op-amp 68 and the output of op-amp 68. The circuit further includes a resistor 74 connected between the inverting input of op-amp 68 and the output of op-amp 52. The output of op-amp 52 is connected to modem connector 26 via resistors 78 and 80 and a capacitor 82.

A critical element of the invention is power distribution circuit 38. Power connector 32 is USB Type 1. As known in the art, "pin 1" of this connector, when coupled to the USB port of a computer, supplies +5 VDC and typically provides at least 100 milliamps of current. "Pin 2" and "pin 3" are the USB data stream and are unconnected in device 10. "Pin 4" is connected to the ground of device 10. Power distribution circuit 38 includes two voltage doubler integrated circuits 84 and 86 connected in series, such as the NJU7660 produced by New Japan Radio Co., Ltd., four diodes 88, 90, 92 and 94, and four capacitors 96, 98, 100 and 102. Many commercially available modems requires the presence of a loop current from the telephone line to operate properly. Voltage doublers 84 and 86 together quadruple the +5 VDC signal to provide sufficient loop current to the modem after flowing through an impedance isolation circuit defined by a transformer 104 and a resistor 106. Transformer 104 is coupled to the +5 VDC pin ("pin 1") of power connector 32 via a resistor 105. The component values are preferably selected to provide approximately 18 milliamps of loop current. This impedance isolation circuit prevents the modem signals from being loaded by the low-impedance power source. The component values of this circuit are preferably selected to provide an impedance of approximately 500 ohms AC at 2000 Hz.

Capacitors 108 and 110 are filter capacitors that reduce any undesirable noise from the USB power signal or the voltage quadrupler circuit.

Modem connector 26 is also configured to draw power from a suitable bus port of a computer if a suitable connector adapter (not shown) is used that splits the power signals off on a separate cable from that carrying the data signals. The cable carrying the power signals can be plugged into a PS2 (mouse) port or a RS-232 port. This configuration would be useful if the computer does not have a USB. In such a configuration, the power signal is coupled into power distribution circuit 38 via resistor 112.

In accordance with the present invention, device 10 draws power directly from computer 12, obviating the need for batteries or an AC line adapter. Absent batteries or an AC line adapter, device 10 can be made small and thus extremely convenient to carry along with one's portable computer.

Obviously, other embodiments and modifications of the present invention will occur readily to those of ordinary skill in the art in view of these teachings. Therefore, this invention is to be limited only by the following claims, which include all such other embodiments and modifications when viewed in conjunction with the above specification and accompanying drawings.

What is claimed is:

1. A method for connecting a modem interface device to a computer, the modem interface device having a telephone base connector, a modem connector, a power connector, a two-to-four-wire converter circuit, and a power distribution circuit, said two-to-four-wire converter circuit bidirectionally coupling signals between said telephone base connector and said modem connector, said power distribution circuit receiving electrical power from said power connector and supplying power to said two-to-four-wire converter circuit and loop current to said modem connector, the method comprising the steps of:

connecting said modem connector to a modem communication port of said computer;

connecting said telephone base connector to a handset jack of a telephone instrument base; and connecting said power connector to a bus port of said computer, said bus port having power and data signals, said power connector coupling only to said power signals and not to said data signals.

2. The method claimed in claim 1, wherein said step of connecting said power connector to a bus port of said computer comprises connecting said power connector to a universal serial bus (USB) port.

3. The method claimed in claim 1, wherein said step of connecting said power connector to a bus port of said computer comprises connecting said power connector to a RS-232 port.

4. The method claimed in claim 1, wherein said step of connecting said power connector to a bus port of said computer comprises connecting said power connector to a PS2 port.

5. The method claimed in claim 1, wherein said computer is a portable computer.

6. The method claimed in claim 5, wherein said step of connecting said power connector to a bus port of said computer comprises connecting said power connector to a universal serial bus (USB) port.

7. The method claimed in claim 5, wherein said step of connecting said power connector to a bus port of said computer comprises connecting said power connector to a RS-232 port.

8. The method claimed in claim 5, wherein said step of connecting said power connector to a bus port of said computer comprises connecting said power connector to a PS2 port.

9. A modem interface device, comprising:

a telephone base connector couplable to a handset jack of a telephone instrument base;

a modem connector couplable to a modem;

a Universal Serial Bus (USB) connector couplable to a USB port of a computer;

a two-to-four-wire converter circuit coupling said modem connector to said telephone base connector in bidirectional data communication; and a power distribution circuit receiving electrical power from said USB connector and supplying power to said two-to-four-wire converter circuit and loop current to said modem connector, said USB connector coupling only power signals from said USB port and not data signals.

10. The modem interface device claimed in claim 9, wherein said power distribution circuit comprises a voltage multiplier circuit.

11. The modem interface device claimed in claim 10, wherein said voltage multiplier circuit is a voltage quadrupler.

* * * * *